Patented Jan. 7, 1947

2,414,014

UNITED STATES PATENT OFFICE 2,414,014

PREPARATION OF THIURAM POLYSULFIDES

George Wesley Cable, New Castle, Del., and Joseph L. Richmond, Woodstown, N. J., assignors to E. I. du Pont de Nemours & Company, Wilmington, Del., a corporation of Delaware No Drawing. Application December 29, 1943,
Serial No. 516,096

11 Claims. (Cl. 260—268)

This invention relates to an improvement in the process for the manufacture of substituted thiuram polysulfides and particularly to their preparation from substituted dithiocarbamic acids derived from heterocyclic imines.

It has been proposed to prepare substituted thiuram polysulfides by reacting sulfur chloride with a dithiocarbamate in an organic solvent. It has also been proposed to carry out such process in an aqueous medium in the presence of caustic alkali, introducing the sulfur chloride as a solution in carbon bisulfide at a low temperature. In this last process, the caustic alkali is sufficient to render the medium neutral or slightly alkaline, but the medium becomes slightly acid during the reaction. Such processes have not been entirely satisfactory and are objectionable in other respects. For example, thiuram tetrasulfides, and particularly dipiperidyl thiuram tetrasulfide, have been prepared by reacting piperidine and carbon bisulfide in aqueous potassium hydroxide to form the potassium salt of pentamethylene dithiocarbamic acid, and then adding a carbon bisulfide solution of sulfur chloride at a low temperature, about 0° C. to 10° C. The yield of dipiperdyl thiuram tetrasulfide by this process is low, being generally about 45% of theory, and a considerable health and fire hazard is presented by the excess of carbon bisulfide employed.

It is an object of our invention to provide an improved process for preparing thiuram polysulfides from salts of substituted dithiocarbamic acids derived from heterocyclic imines. Another object is to improve the prior process for producing such thiuram polysulfides so as to materially increase the yield obtained, to largely eliminate the health and fire hazards and to produce a more commercially practicable process. Other objects are to advance the art. Still other objects will appear hereinafter.

The above and other objects of our invention may be accomplished by reacting a metal salt of a substituted dithiocarbamic acid, derived from an unsubstituted saturated heterocyclic imine in which the heterocyclic ring contains from 5 to 7 members of which at least 4 members are carbon atoms and from 1 to 2 members are hetero atoms, at least one of the hetero atoms being the imino N atom, with sulfur chloride in an aqueous medium in the presence of a mildly alkaline substance in an amount sufficient to maintain the pH of the reaction mass between 7 and 11. By carrying out the reaction in the presence of the mildly alkaline substance, we are able to obtain materially increased yields of a purer product, to eliminate the necessity of an organic solvent with its disadvantages and to carry out the reaction at higher temperatures which are more practical commercially.

The dithiocarbamic acids, whose salts are to be employed as the starting materials, are those which are derived from unsubstituted saturated heterocyclic imines in which the heterocyclic ring contains from 5 to 7 members of which 4 members are carbon atoms and from 1 to 2 members are hetero atoms, the imino N atom constituting one of such hetero atoms. By "derived" from the heterocyclic imines, we mean identical with that obtained by reaction with carbon bisulfide so that the heterocyclic ring remains intact and the imino N atom of the ring is the N atom of the dithiocarbamic acid as in the following equation:

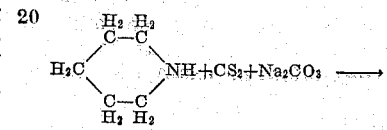

Piperidine

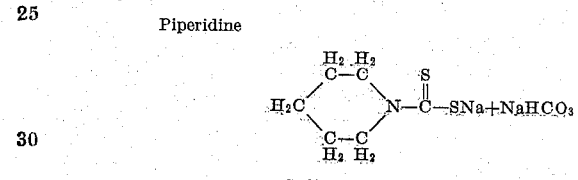

Sodium piperidyl dithiocarbamate

Our invention is preferably directed to the preparation of the thiuram polysulfides from the salts of piperidyl dithiocarbamic acid, morpholyl dithiocarbamic acid and piperazyl dithiocarbamic acid which are derived from piperidine, morpholine and piperazine, respectively, and particularly from piperidyl dithiocarbamic acid.

We particularly intend to exclude from within the scope of our invention the salts of dithiocarbamic acids derived from aliphatic and aromatic amines, such as dibutylamine and ethylaniline, since the salts of such dithiocarbamic acids do not, when employed in our process, appear to react in the same manner as the heterocyclic dithiocarbamates to form analogous polysulfides.

The salts of the dithiocarbamic acids may be the salts of any metal, but preferably will be salts of the alkali metals. The metal salt of the dithiocarbamic acid may be dissolved or suspended in the aqueous medium.

By the term "sulfur chloride," we mean compounds of the formula $S_xCl_2$, wherein $x$ represents a whole number greater than 1. Such sulfur chloride generally comprises a mixture of compounds of sulfur and chlorine, S₂Cl₂, S₃Cl₂, etc.

The main feature of our invention and departure from the prior art process, which produces our novel results, resides in employing a mildly alkaline substance in place of the caustic alkali heretofore employed.

By a mildly alkaline substance, we mean a substance which, in aqueous solution, gives a pH between 7 and 11. Preferably, the substance is a mildly alkaline alkali metal salt and particularly an alkali metal carbonate. Representative of such salts are sodium carbonate, sodium bicarbonate, potassium carbonate, potassium bicarbonate, sodium acetate, potassium acetate, borax, disodium phosphate, dipotassium phosphate, tetrasodium pyrophosphate and tetrapotassium pyrophosphate. Of these, sodium carbonate and potassium carbonate are preferred. The mildly alkaline substance is employed in a proportion sufficient to maintain the pH of the reaction between 7 and 11 throughout the reaction.

When employing such mildly alkaline substances, we have found it to be unnecessary to add the sulfur chloride in solution in a solvent, such as carbon bisulfide, and we thereby avoid the health and fire hazards which have been involved heretofore in the use of excessive amounts of carbon bisulfide. By thus eliminating the necessity of employing carbon bisulfide as a solvent for the sulfur chloride, we are able to carry out the reaction at higher temperatures as high as 35° C., which temperatures are more practical in the commercial operation of the process. We particularly prefer to carry out the reaction at temperatures of from about 30° C. to about 35° C.

In order to more clearly illustrate our invention, the preferred modes of carrying the same into effect and the advantageous results to be obtained thereby, the following examples are given:

*Example 1*

Piperidyl dithiocarbamic acid sodium salt was prepared as an aqueous suspension and then reacted with sulfur chloride without isolation as follows: 60 parts by weight of piperidine and 90 parts by weight of anhydrous sodium carbonate were dissolved in 550 parts by weight of water. 65 parts by weight of carbon bisulfide were added to this solution at 20–25° C. with agitation. To the slurry of piperidyl dithiocarbamic acid sodium salt thus obtained, 95 parts by weight of sodium carbonate were added. The mass was warmed to 30–35° C. and agitated to dissolve the sodium carbonate. 100 parts of sulfur chloride were added slowly to the slurry, holding the temperature at 30–35° C. The dipiperidyl thiuram tetrasulfide, which precipitated, was recovered by filtration and washed free of inorganic salts with water. The wet product was washed with acetone, to remove a small amount of tar, and dried. The product was a light yellow powder having a melting point of 117° C. The yield was 95% of theory.

*Example 2*

Piperidyl dithiocarbamic acid potassium salt was prepared as an aqueous solution and then reacted with sulfur chloride, without isolation, as follows:

60 parts of piperidine and 117.5 parts of potassium carbonate were dissolved in 550 parts of water in an agitated vessel. 65 parts of carbon bisulfide were added slowly to this solution while the temperature was maintained at 20–25° C. The mass was agitated during this addition. This solution was agitated and warmed to 30–35° C. 123.3 parts potassium carbonate were dissolved in the solution, to which was then added slowly 110 parts sulfur chloride at 30–35° C. The dipiperidyl thiuram tetrasulfide, which precipitated, was recovered by filtration, washed with water and then with acetone. The yield was 91.3% of theory.

*Example 3*

Di-morpholyl thiuram tetrasulfide was made by reacting morpholine (di-ethylene imide oxide) and carbon bisulfide in the presence of potassium hydroxide to give the substituted dithiocarbamate and then reacting this with sulfur monochloride in the presence of sodium carbonate.

61.0 parts by weight of morpholine were dissolved in 500 parts of water. 95.5 parts of 50% potassium hydroxide were added with good agitation. The mass was cooled to 20° C. and 65.0 parts carbon bisulfide were added at 20–25° C. 50% sulfuric acid was now added to make the mass just neutral to Clayton Yellow but still alkaline to Brilliant Yellow.

95.0 parts of sodium carbonate were added. After this had dissolved, 100.0 parts of sulfur monochloride were added slowly at 30–35° C.

A soft gummy precipitate formed which crystallized on standing. This was filtered off, washed with water and then with acetone. This gave a yellow powder having a melting range of 111.5° to 114.5° C. The yield was 73.5 parts by weight corresponding to 61.2% of theory. The formula of this product is believed to be

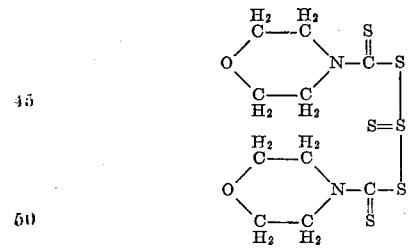

*Example 4*

A substituted thiuram polysulfide was made from piperazine (di-ethylene diamine) as follows:

46.5 parts piperazine hexahydrate were dissolved in 351.0 parts water. 67.0 parts of potassium hydroxide (50%) were added. This solution was cooled to 20–25° C. and 45.6 parts carbon bisulfide were added slowly at this temperature. The mass was kept alkaline to Clayton Yellow papers by addition of potassium hydroxide. When the reaction was complete, a small amount of hydrochloric acid was added to make the solution neutral to Clayton Yellow but still alkaline to Brilliant Yellow papers. Then 87 parts sodium carbonate were added. 70.3 parts sulfur chloride were added slowly at 30–35° C. The thiuram polysulfide, which precipitated, was filtered off and washed first with water and then with acetone. It was dried at 50° C. The product was a light yellow powder having a melting point of 210.0° C.

It is thought to have the following structure:

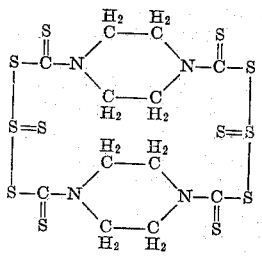

The yield was 47.0 parts by weight corresponding to 66.2% of theory.

The advantages of our process over that of the prior art and over similar processes, employing caustic alkali, will be more clearly apparent from the following examples:

*Example 5*

A substituted thiuram polysulfide was made from piperidine, following a procedure similar to that outlined in U. S. Patent 1,798,588 to Cambron. This gave a yield appreciably lower than that obtained by the method employed in Example 1.

60 gms. piperidine were dissolved in 550 ccs. water and 100 gms. 30% caustic soda added. 65 gms. carbon disulfide were added slowly while the temperature of the reaction mass was held at 20–25° C. Then 50% sulfuric acid was added to reduce the alkalinity to a point where the mass turned phenolphthalein papers only a very light pink. Then 100 gms. sulfur chloride were added slowly while the temperature of the mass was held at 30–35° C. The mass remained about neutral at first and finally became acid to Congo red papers. The product precipitated as a gummy mass which finally hardened on drying. The yield was 89.7 gms. corresponding to 68.3% of theory, compared to the yield of 95% in Example 1.

*Example 6*

An experiment was made using caustic soda as the alkaline substance present during the addition of sulfur chloride. Sufficient caustic soda was added to keep the mass alkaline to Clayton yellow papers (pH over 11). Otherwise the procedure followed was similar to that described in Example 1. The yield obtained was 63.6% of theory, compared to 95% obtained in Example 1.

*Example 7*

Piperidyl dithiocarbamic acid, potassium salt, was prepared as an aqueous solution and then reacted with sulfur chloride as follows:

60 parts by weight of piperidine were dissolved in 270 parts of water. 103 parts of 42% caustic potash were added, keeping the temperature at 0–5° C. To this solution were added 60 parts of carbon bisulfide, keeping the temperature below 15° C. A mixture of 48 parts of sulfur chloride and 28 parts of carbon bisulfide (solvent) was added, keeping the temperature below 10° C. The mass was then made just acid to Congo red papers with 5% hydrochloric acid. The mass was filtered and washed with water and then with acetone. The cake was dried at 65° C. The yield was 49.6% of theory of di-piperidyl thiuram tetrasulfide having a melting point of 116° C., compared to 91.3% yield of Example 2.

When Examples 5 to 7 are compared with Examples 1 to 4, it will be apparent that caustic alkalies are not the equivalent of the mildly alkaline substances of our invention and do not produce the same results. By the use of the mildly alkaline substances, we have obtained much higher yields of purer products than can be obtained by the use of caustic alkalies. That the mildly alkaline substances of our invention and caustic alkalies are not equivalents is also shown by the fact that the aromatic and open chain aliphatic substituted dithiocarbamates can be converted to the polysulfides in the presence of caustic alkali, but corresponding products are not obtained from such dithiocarbamates in the presence of the mildly alkaline substances of our invention.

It will be understood that the above examples are given for illustrative purposes solely and that our invention is not to be limited to the specific embodiments disclosed therein, but that many variations and modifications can be made therein without departing from the spirit or scope of our invention. For example, other mildly alkaline substances may be substituted for those employed in the examples, the temperatures may be varied and other heterocyclic dithiocarbamates may be treated similarly.

It will thus be apparent that, by our invention, we have provided a process whereby the heterocyclic thiuram polysulfides may be obtained in higher yields and higher purity. Also, by our process, the health and fire hazards, involved in using carbon bisulfide as a solvent for the sulfur chloride, have been eliminated. Furthermore, by our process, we are able to carry out the reaction at higher and more practicable temperatures, thereby effecting substantial economies. We, therefore, believe that our invention constitutes a very substantial advance in the art.

We claim:

1. The process for preparing thiuram polysulfides which comprises reacting a metal salt of a substituted dithiocarbamic acid derived from an unsubstituted saturated heterocyclic imine in which the heterocyclic ring contains from 5 to 7 members of which at least 4 are carbon atoms and from 1 to 2 are hetero atoms, at least 1 of the hetero atoms being the imino N atom, with sulfur chloride in an aqueous medium in the presence of a mildly alkaline substance in an amount sufficient to maintain the pH of the reaction mass between 7 and 11.

2. The process for preparing thiuram polysulfides which comprises reacting an alkali metal salt of a substituted dithiocarbamic acid derived from an unsubstituted saturated heterocyclic imine in which the heterocyclic ring contains from 5 to 7 members of which at least 4 are carbon atoms and from 1 to 2 are hetero atoms, at least 1 of the hetero atoms being the imino N atom, with sulfur chloride in an aqueous medium in the presence of a mildly alkaline substance in an amount sufficient to maintain the pH of the reaction mass between 7 and 11.

3. The process for preparing thiuram polysulfides which comprises reacting an alkali metal salt of a substituted dithiocarbamic acid derived from an unsubstituted saturated heterocyclic imine in which the heterocyclic ring contains from 5 to 7 members of which at least 4 are carbon atoms and from 1 to 2 are hetero atoms, at least 1 of the hetero atoms being the imino N atom, with sulfur chloride in an aqueous medium in the presence of a mildly alkaline alkali metal salt in an amount sufficient to maintain the pH of the reaction mass between 7 and 11.

4. The process for preparing thiuram polysulfides which comprises reacting an alkali metal salt of a substituted dithiocarbamic acid derived from an unsubstituted saturated heterocyclic imine in which the heterocyclic ring contains from 5 to 7 members of which at least 4 are carbon atoms and from 1 to 2 are hetero atoms, at least 1 of the hetero atoms being the imino N atom, with sulfur chloride in an aqueous medium in the presence of an alkali metal carbonate in an amount sufficient to maintain the pH of the reaction mass between 7 and 11.

5. The process for preparing thiuram polysulfides which comprises reacting a metal salt of a substituted dithiocarbamic acid of the class consisting of piperidyl dithiocarbamic acid, morpholyl dithiocarbamic acid and piperazyl dithiocarbamic acid, with sulfur chloride in an aqueous medium in the presence of a mildly alkaline substance in an amount sufficient to maintain the pH of the reaction mass between 7 and 11.

6. The process for preparing thiuram polysulfides which comprises reacting an alkali metal salt of a substituted dithiocarbamic acid of the class consisting of piperidyl dithiocarbamic acid, morpholyl dithiocarbamic acid and piperazyl dithiocarbamic acid, with sulfur chloride in an aqueous medium in the presence of a mildly alkaline alkali metal salt in an amount sufficient to maintain the pH of the reaction mass between 7 and 11.

7. The process for preparing thiuram polysulfides which comprises reacting an alkali metal salt of a substituted dithiocarbamic acid of the class consisting of piperidyl dithiocarbamic acid, morpholyl dithiocarbamic acid and piperazyl dithiocarbamic acid, with sulfur chloride in an aqueous medium in the presence of an alkali metal carbonate in an amount sufficient to maintain the pH of the reaction mass between 7 and 11.

8. The process for preparing a thiuram polysulfide which comprises reacting a metal salt of piperidyl dithiocarbamic acid with sulfur chloride in an aqueous medium in the presence of a mildly alkaline substance in an amount sufficient to maintain the pH of the reaction mass between 7 and 11.

9. The process for preparing a thiuram polysulfide which comprises reacting an alkali metal salt of piperidyl dithiocarbamic acid with sulfur chloride in an aqueous medium in the presence of a mildly alkaline alkali metal salt in an amount sufficient to maintain the pH of the reaction mass between 7 and 11.

10. The process for preparing a thiuram polysulfide which comprises reacting an alkali metal salt of piperidyl dithiocarbamic acid with sulfur chloride in an aqueous medium in the presence of an alkali metal carbonate in an amount sufficient to maintain the pH of the reaction mass between 7 and 11.

11. The process for preparing a thiuram polysulfide which comprises reacting the sodium salt of piperidyl dithiocarbamic acid with sulfur chloride in an aqueous medium in the presence of sodium carbonate in an amount sufficient to maintain the pH of the reaction mass between 7 and 11.

GEORGE WESLEY CABLE.
JOSEPH L. RICHMOND.